(12) United States Patent
Lucas et al.

(10) Patent No.: US 8,020,893 B2
(45) Date of Patent: Sep. 20, 2011

(54) STEERING COLUMN ASSEMBLY INCLUDING A MECHANICAL STRUT AND MACHINE USING SAME

(75) Inventors: Dave Lucas, Metamora, IL (US); James D. Morris, Jr., Peoria, IL (US); Tyler Henderson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1025 days.

(21) Appl. No.: 11/904,495

(22) Filed: Sep. 27, 2007

(65) Prior Publication Data
US 2009/0107284 A1 Apr. 30, 2009

(51) Int. Cl.
B62D 1/18 (2006.01)
(52) U.S. Cl. .................................. 280/775; 280/779
(58) Field of Classification Search .................. 280/775, 280/779
See application file for complete search history.

(56) References Cited

U.S. PATENT DOCUMENTS

| | | |
|---|---|---|
| 973,806 A | 10/1910 | Noble |
| 2,646,860 A | 7/1953 | Pirard |
| 2,750,994 A | 6/1956 | Howell |
| 2,792,719 A | 5/1957 | Lanzone |
| 2,947,556 A | 8/1960 | Wenger |
| 3,188,880 A | 6/1965 | Alexander |
| 3,276,816 A | 10/1966 | Edwards |
| 3,404,581 A | 10/1968 | Kraus |
| 3,434,368 A | 3/1969 | Runkle |
| 3,434,369 A | 3/1969 | Runkle |
| 4,075,903 A | 2/1978 | Cornell |
| 4,200,166 A | 4/1980 | Hansen |
| 4,236,609 A | 12/1980 | Carlsson |
| 4,347,757 A | 9/1982 | Martin |
| 4,418,582 A | 12/1983 | Martin |
| 4,563,912 A | 1/1986 | Parks |
| 4,572,023 A | 2/1986 | Euler |
| 4,893,518 A * | 1/1990 | Matsumoto et al. ............ 74/493 |
| 4,899,431 A | 2/1990 | Borntrager |
| 4,900,059 A * | 2/1990 | Kinoshita et al. ............ 280/775 |
| 4,901,593 A * | 2/1990 | Ishikawa ........................ 74/493 |
| 4,993,279 A | 2/1991 | Doescher et al. |
| 5,163,337 A * | 11/1992 | Herron et al. ................... 74/493 |
| 5,273,240 A | 12/1993 | Sharon |
| 5,449,199 A * | 9/1995 | Heinrichs et al. ............ 280/775 |
| 5,570,610 A | 11/1996 | Cymbal |
| 5,613,404 A | 3/1997 | Lykken et al. |
| 5,634,537 A | 6/1997 | Thorn |
| 5,690,362 A * | 11/1997 | Peitsmeier et al. .......... 280/775 |
| 5,775,469 A | 7/1998 | Kang |
| 6,176,150 B1 | 1/2001 | Fogeling |
| 6,279,951 B1 * | 8/2001 | Cartwright et al. .......... 280/775 |
| 6,390,505 B1 * | 5/2002 | Wilson .......................... 280/775 |
| 6,698,967 B2 | 3/2004 | Henrich |
| 7,014,255 B2 | 3/2006 | Amamiya et al. |
| 7,025,380 B2 * | 4/2006 | Arihara ........................ 280/775 |
| 7,174,804 B2 | 2/2007 | Adoline et al. |
| 7,191,679 B2 * | 3/2007 | Tomaru et al. ................. 74/493 |
| 7,201,259 B2 | 4/2007 | Knaust |
| 7,226,082 B2 * | 6/2007 | Muramatsu et al. .......... 280/775 |
| 2005/0087405 A1 | 4/2005 | Schmalenbach |

* cited by examiner

*Primary Examiner* — Toan C To
(74) *Attorney, Agent, or Firm* — Liell & McNeil (57) ABSTRACT

A machine includes a steering column assembly and a mechanical strut pivotably attached to the steering column assembly. The mechanical strut, free of pressurized gas, is positioned to tilt at least a portion of the steering column assembly about an axis. A tilt adjustment mechanism is movable to release a friction lock mechanism within the mechanical strut. The mechanical strut is telescopically movable through a continuous range of positions when the friction lock mechanism is released.

20 Claims, 8 Drawing Sheets

STEERING COLUMN ASSEMBLY INCLUDING A MECHANICAL STRUT AND MACHINE USING SAME

TECHNICAL FIELD

The present disclosure relates generally to a steering column assembly, and more particularly to a mechanical strut that allows movement of a portion of the steering column assembly through a continuous range of positions.

BACKGROUND

Adjustment devices, including pneumatic and mechanical struts, are used in a number of applications. According to one example, an adjustment device includes a finite number of notches or teeth at which the device may be locked. Specifically, U.S. Publication No. 2006/0000656 teaches a seat having an armrest that is movable to one of a finite number of armrest lengths. Specifically, an operator can pull on an arm position lock release that will move a spring loaded pin from one of a finite number of arm position bores. Once the operator has selected an appropriate armrest length, the operator may release the arm position lock release and allow the pin to reinsert itself within one of the arm bores.

An alternative adjustment device may include a well known gas strut. A gas strut may provide adjustment through a continuous range of positions; however, because a gas strut requires seals, it is susceptible to leaks of pressurized gas during operation. Such pressurized gas leaks, if not addressed, may lead to ultimate failure of the strut.

The present disclosure is directed to one or more of the problems set forth above.

SUMMARY OF THE DISCLOSURE

In one aspect, a machine includes a steering column assembly and a mechanical strut pivotably attached to the steering column assembly. The mechanical strut, free of pressurized gas, is positioned to tilt at least a portion of the steering column assembly about an axis. A tilt adjustment mechanism is movable to release a friction lock mechanism within the mechanical strut. The mechanical strut is telescopically movable through a continuous range of positions when the friction lock mechanism is released.

In another aspect, a method of tilting at least a portion of a steering column assembly about an axis includes a step of actuating a tilt adjustment mechanism of the steering column assembly to release a friction lock mechanism of a mechanical strut. The portion of the steering column assembly is then tilted through a continuous range of positions. The tilt adjustment mechanism is released to engage the friction lock mechanism of the mechanical strut.

DETAILED DESCRIPTION

Figure 1:
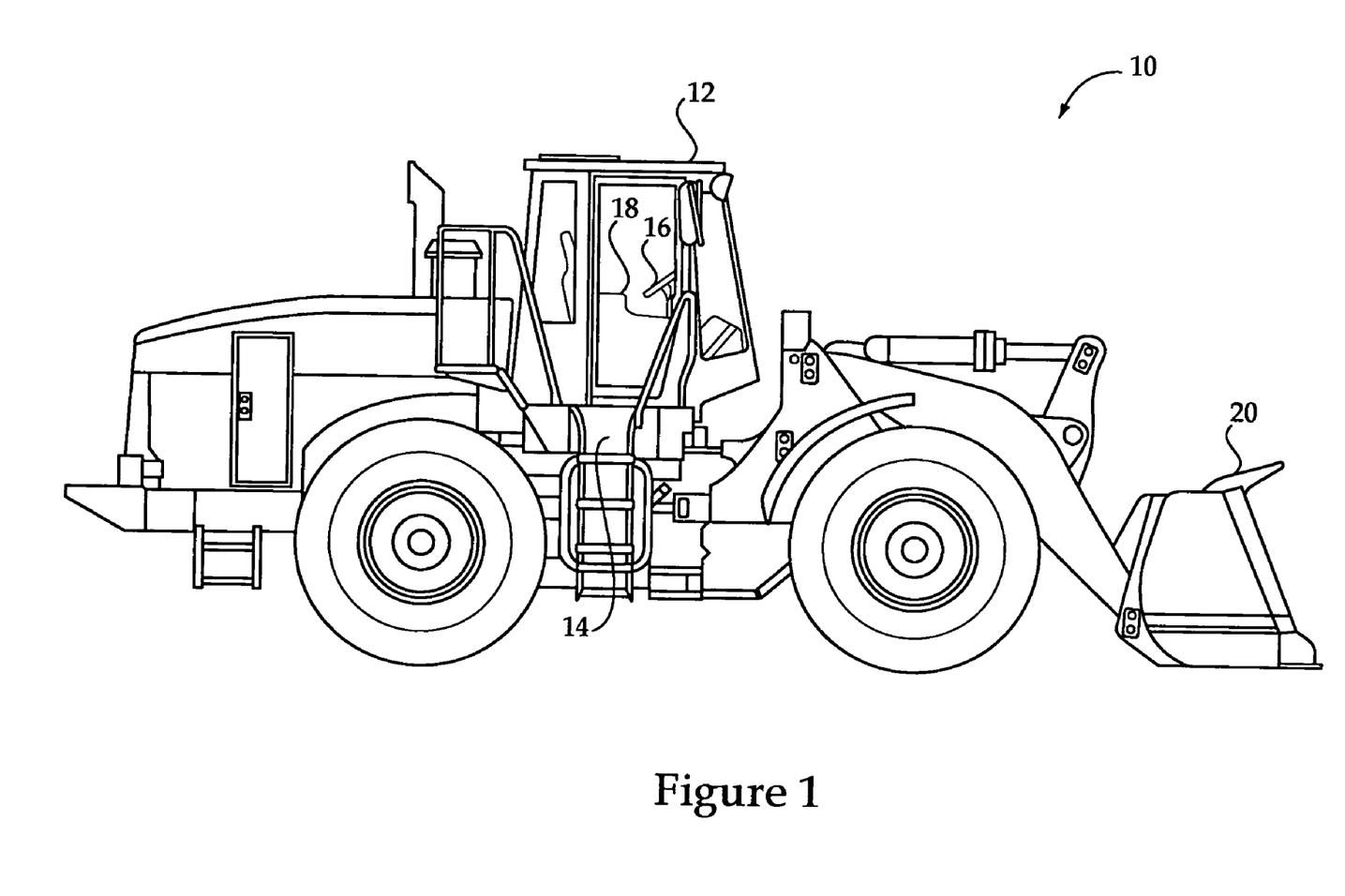
FIG. 1 is a side diagrammatic view of a machine according to the present disclosure.

An exemplary embodiment of a machine 10 is shown generally in FIG. 1. The machine 10 may be a wheel loader, as shown, or any other machine or vehicle having an operator control station 12. The operator control station 12 is mounted to a body 14 of the machine 10 and may include a steering column assembly 16 and a seat assembly 18. The operator control station 12 may include various other devices, including, but not limited to, one or more machine operation controllers (shown in FIG. 6). For example, a machine operation controller may be provided for controlling movement of an implement 20, such as a bucket, of the machine 10.

Figure 2:
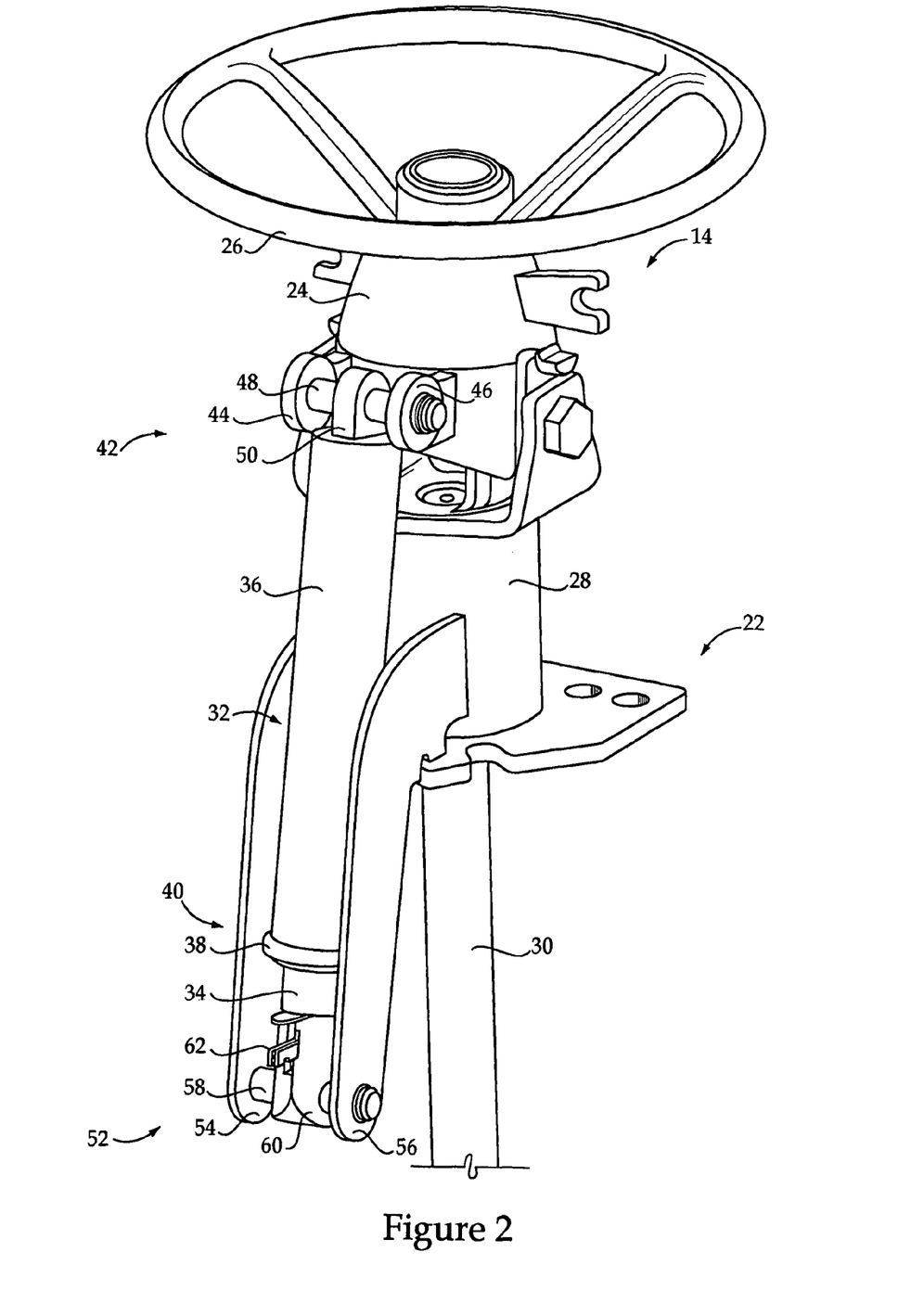
FIG. 2 is a perspective view of a steering column assembly of the machine of FIG. 1.

The steering column assembly 16 is shown generally in FIG. 2, and includes a steering column 22 and a base 24 for a steering wheel 26. The steering column 22 may include one or more columns, such as, for example, columns 28 and 30. The steering column assembly 16 also includes a mechanical strut 32. The mechanical strut 32 includes an inner tube 34 and an outer tube 36 having a slightly larger diameter than inner tube 34. The outer tube 36 is configured to telescopically receive the inner tube 34 and may provide a continuous range of lengths between a fully expanded length and a fully retracted length of the mechanical strut 32. In some configurations, the inner and outer tubes 34 and 36 may have a substantially uniform circular cross-section. Alternatively, the inner and outer tubes 34 and 36 may have other uniform or non-uniform cross sections.

A guard member 38, which is something other than a pneumatic seal, may be provided over a distal end 40 of the outer tube 36. The guard member 38 may prevent dust and various other airborne particles from entering the outer tube 36 via an external surface of the inner tube 34 when the inner tube 34 is being telescopically received within the outer tube 36. Guard member 38 may have substantially the same diameter as the inner tube 34, and may be made of any material, including, but not limited to, a plastic or rubber.

The outer tube 36, at a first attachment end 42 of the mechanical strut 32, may be pivotably attached to the steering wheel base 24. Specifically, the outer tube 36 may pivot about a pin 48 that extends through each of a first plate 44, a first end 50 of the outer tube 36, and a second plate 46. The inner tube 34, at a second attachment end 52 of the mechanical strut 32, may be pivotably attached to a portion of the steering column 22, such as column 28. More specifically, the inner tube 34 may pivot about a pin 58 extending through each of a first plate 54, a first end 60 of the inner tube 34, and a second plate 56. The first end 60 of the inner tube 34 may also include a trigger 62 for releasing a friction lock mechanism (shown in FIG. 3) of the mechanical strut 32.

Although the outer tube 36 is shown pivotably attached to the steering wheel base 24 and the inner tube 34 is shown pivotably attached to column 28 of the steering column 22, it should be appreciated that each of the outer tube 36 and the inner tube 34 may be attached to any part of the steering column assembly 16. For example, it may be desirable to pivotably attach the outer tube 36 to column 28 and the inner tube 34 to column 30. The positioning of mechanical strut 32, it should be appreciated, will determine the location of the axis about which a portion of the steering column assembly 16 will rotate.

Figure 3:
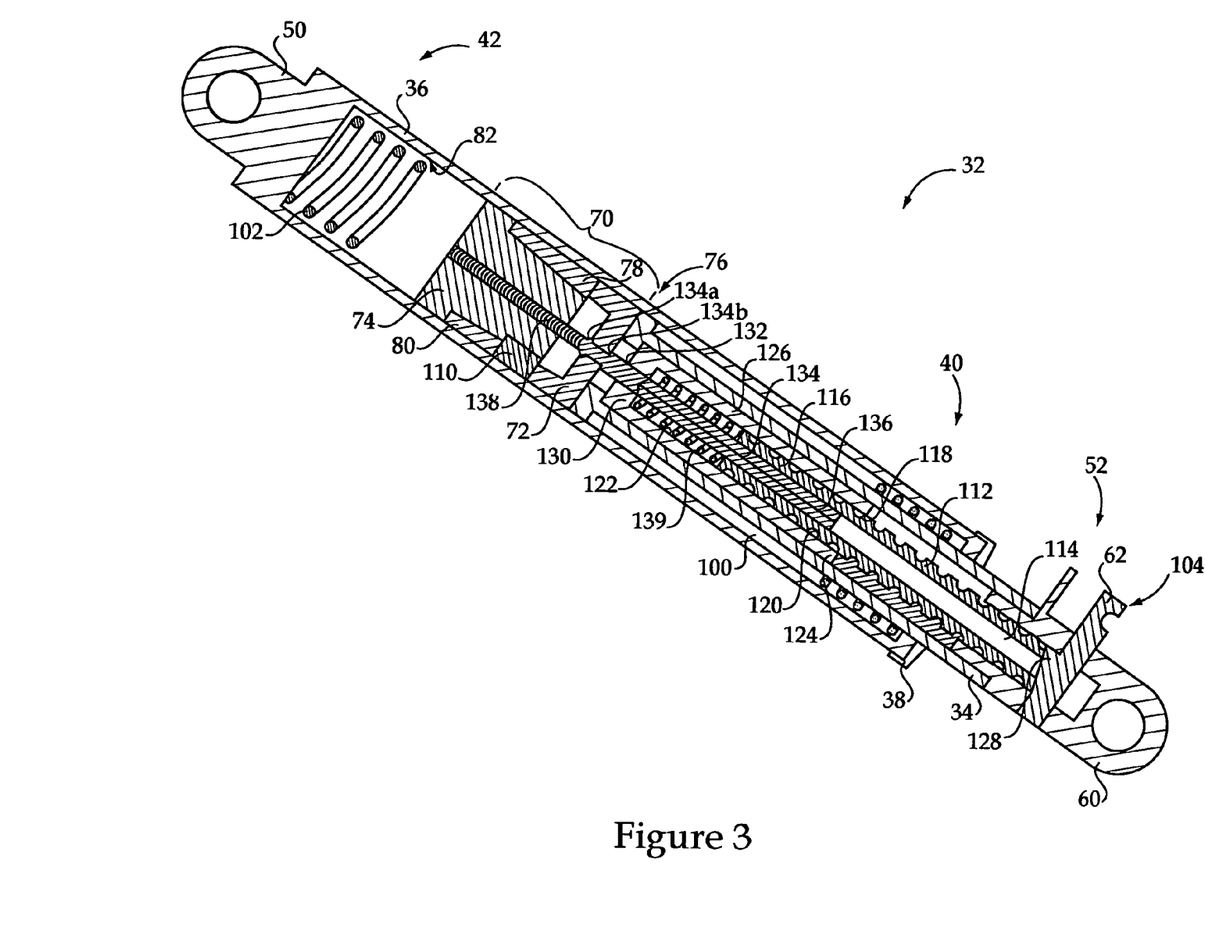
FIG. 3 is a side diagrammatic view in cross section of a mechanical strut of the steering column assembly of FIG. 2.

A configuration of the mechanical strut 32 is shown in greater detail in FIG. 3. Specifically, a cross section of the mechanical strut 32 illustrates the friction lock mechanism 70. The friction lock mechanism 70 includes a first locking member 72 and a second locking member 74 that may include a substantially frustoconical shape, as shown. The first locking member 72 may be fixedly attached to a distal end 76 of the inner tube 34 and may include a structure having at least one finger, such as, for example, fingers 78 and 80, for receiving the second locking member 74. Engagement of the first and second locking members 72 and 74 forces at least one of fingers 78 and 80 of the first locking member 72 into frictional engagement with an inner surface 82 of the outer tube 36, thereby preventing telescopic movement of the mechanical strut 32. This configuration of the friction lock mechanism 70 may be referred to as an engaged configuration.

Figure 4:
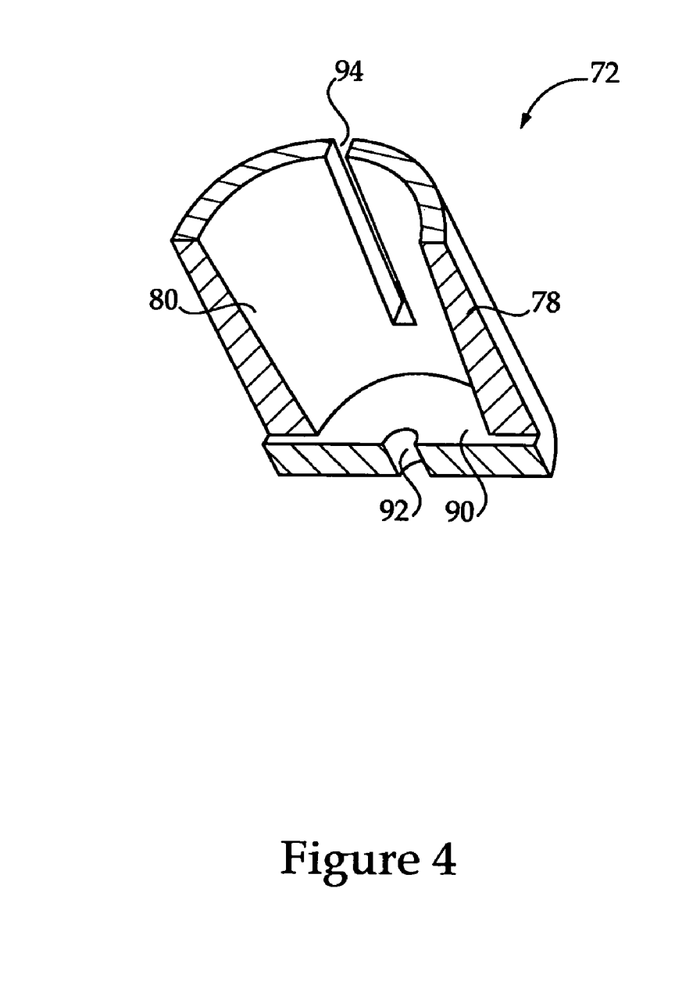
FIG. 4 is an isometric view of a first locking member of a friction lock mechanism according to the present disclosure.
Figure 5:
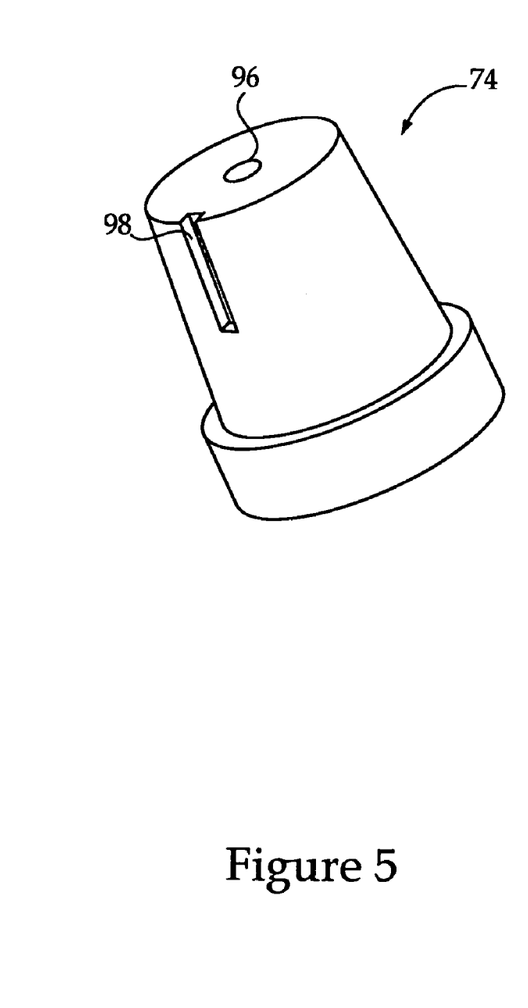
FIG. 5 is an isometric view of a second locking member of a friction lock mechanism according to the present disclosure.

The first locking member 72 of the friction lock mechanism 70 can be seen generally in FIG. 4. Fingers 78 and 80 may extend from a base 90 that is fixedly attached to the distal end 76 of inner tube 34. Base 90 may also include an opening 92. A slot 94, or gap, between fingers 78 and 80 may also be provided for receiving a key, as described below. The second locking member 74 of the friction lock mechanism 70 can be seen generally in FIG. 5. Second locking member 74 may also include an opening 96 and a slot 98 for receiving a key.

Figure 8:
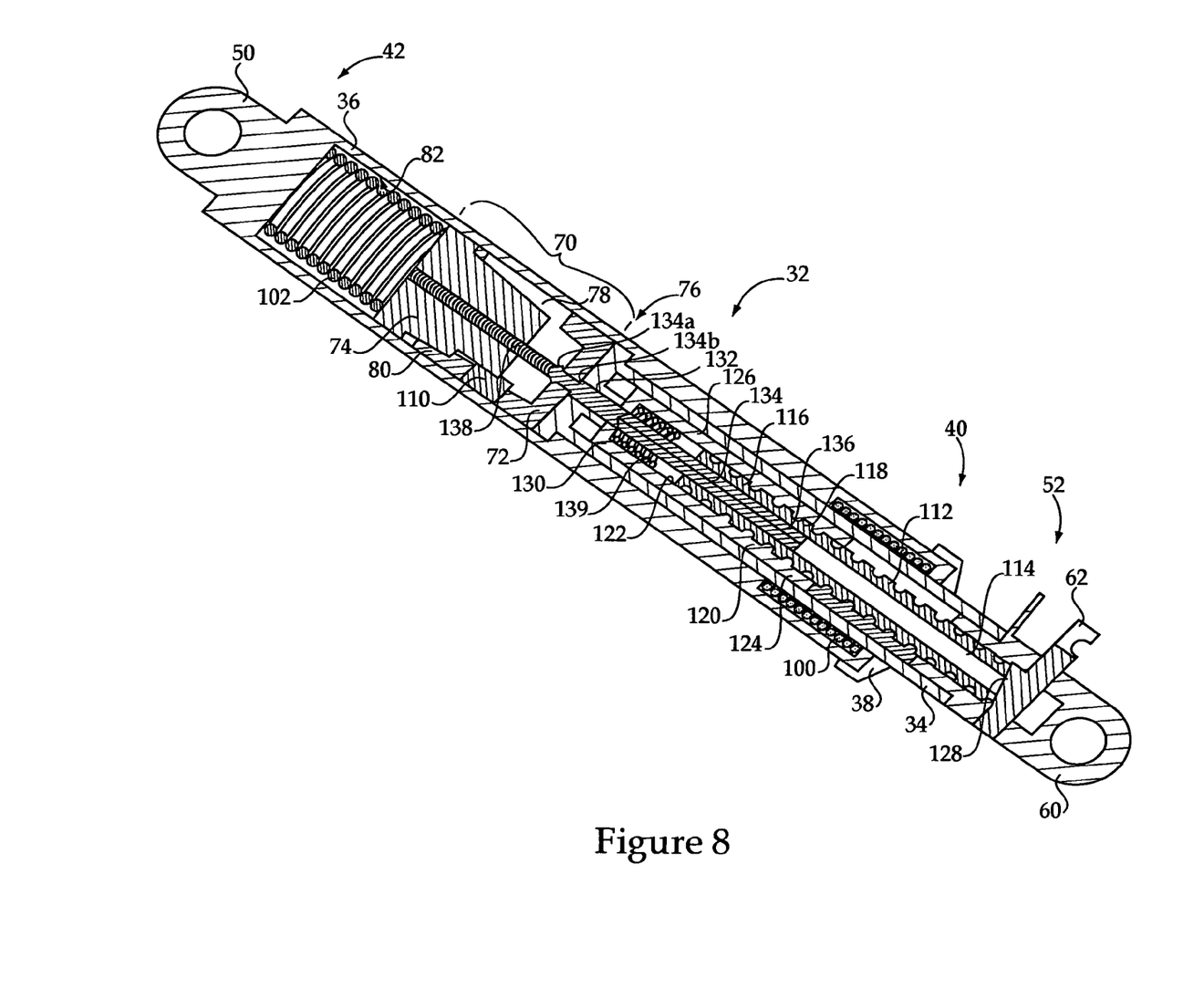
FIG. 8 is a side diagrammatic view in cross section of the mechanical strut of FIG. 3 in a retracted position.
Figure 9:
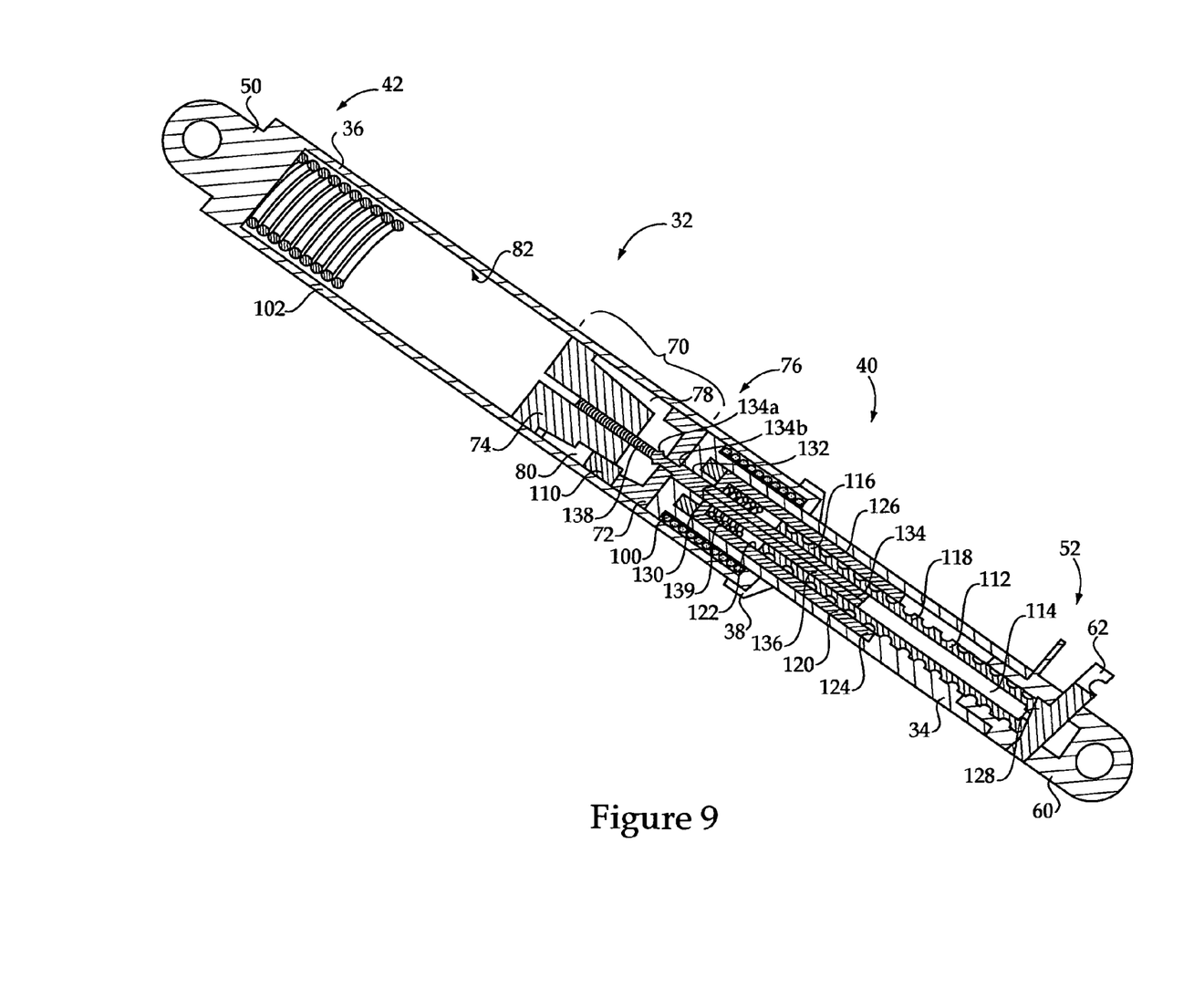
FIG. 9 is a side diagrammatic view in cross section of the mechanical strut of FIG. 3 in an expanded position.

Referring again to FIG. 3, a first spring 100 and a second spring 102 may provide a desired amount of resistance when the mechanical strut 32 reaches a fully extended or a fully retracted position in order to protect internal components of the mechanical strut 32. Thus, springs 100 and 102 may only come into play when mechanical strut 32 is approaching one of its extreme positions as shown in FIGS. 8 and 9, but are otherwise uncompressed. Alternatively, first and second springs 100 and 102 may bias the first locking member 72 and the second locking member 74 into engagement and, as a result, into frictional engagement with the outer tube 36. Specifically, at least one of the fingers 78 and 80 may frictionally engage the inner surface 82 of the outer tube 36.

A tilt adjustment mechanism 104 may include trigger 62 pivotably attached to an attachment end of the mechanical strut 32, such as the second attachment end 52, for moving the second locking member 74 out of engagement with the first locking member 72 and into a released configuration. A key 110 may be positioned within at least a portion of each of the first locking member 72 and the second locking member 74 for preventing one of the first and second locking members 72 and 74, respectively, from rotating relative to the other. For example, the key 110 may be positioned within slot 94 of the first locking member 72 and slot 98 of the second locking member 74.

A threaded member 112 includes a first end 114 having a notch that receives a portion of the trigger 62 so that threaded member 112 is prevented from rotating. The threaded member 112 is movable along a linear axis within the inner tube 34 in response to movement of the trigger 62. A second end 116 of the threaded member 112, having threads 118 on the exterior thereof, is configured to engage a spiral patterned protrusion 120 extending from an internal surface 122 of a first end 124 of an elongate sleeve 126 provided within the inner tube 34. The spiral patterned protrusion 120 may, alternatively, include a series of bearings positioned within one or more spiral patterned grooves within the internal surface 122 of the sleeve 126. When the threaded member 112 is moved in a linear direction, via actuation of the trigger 62, threads 118 of the threaded member 112 engage the spiral patterned protrusion 120 of the sleeve 126 and cause the sleeve 126 to rotate about the longitudinal axis of the mechanical strut 32. It should be appreciated that a portion 128 of the trigger 62 may extend into the first end 114 of the threaded member 112 to prevent the threaded member 112 from rotating, but other strategies that prevent rotation are also within the scope of the present disclosure.

A second end 130 of the sleeve 126 includes a hexagonal shaped bore 132 therethrough for receiving a rod 134. The rod 134 includes a hexagonal shaped first end 136 extending through the bore 132 and a second end 138 threadably attached to the second locking member 74, such as by a threaded engagement. Rotational movement of the sleeve 126, therefore, causes rotational movement of the rod 134. It should be appreciated that the rod 134 also extends through the opening 92 of the first locking member 72 and may include a pair of annular shoulders, such as 134a and 134b, for limiting the linear movement of the first locking member 72 with respect to rod 134.

The key 110 is positioned within at least a portion of each of the first locking member 72 and the second locking member 74 for preventing one of the first locking member 72 and the second locking member 74 from rotating relative to the other. The key 110 prevents the rotational movement of the rod 134 from rotating the second locking member 74 and, indirectly, the first locking member 72, and causes the second locking member 74 to move in a linear direction into and out of engagement with the first locking member 72 based on a rotational direction of the rod 116. A spring 139 may be provided within inner tube 34 or sleeve 126 for biasing the threaded member 112 and, indirectly, the trigger 62 toward the attachment end 52. When biased in such a manner, the trigger 62 remains in a non-actuated position.

It should be appreciated that the spring 139 is provided with sufficient preload to force the threaded member 112 toward the second attachment end 52, thereby rotating the sleeve 126 and rod 116 in an opposite direction and pulling the second locking member 74 into engagement with the first locking member 72. Engagement of the first and second locking members 72 and 74 forces at least one of fingers 78 and 80 of the first locking member 72 into frictional engagement with an inner surface 82 of the outer tube 36, thereby preventing telescopic movement of the mechanical strut 32. Actuating the trigger 62 acts against the force of the spring 139 to move the friction lock mechanism 70 from the engaged configuration to the released configuration.

Figure 6:
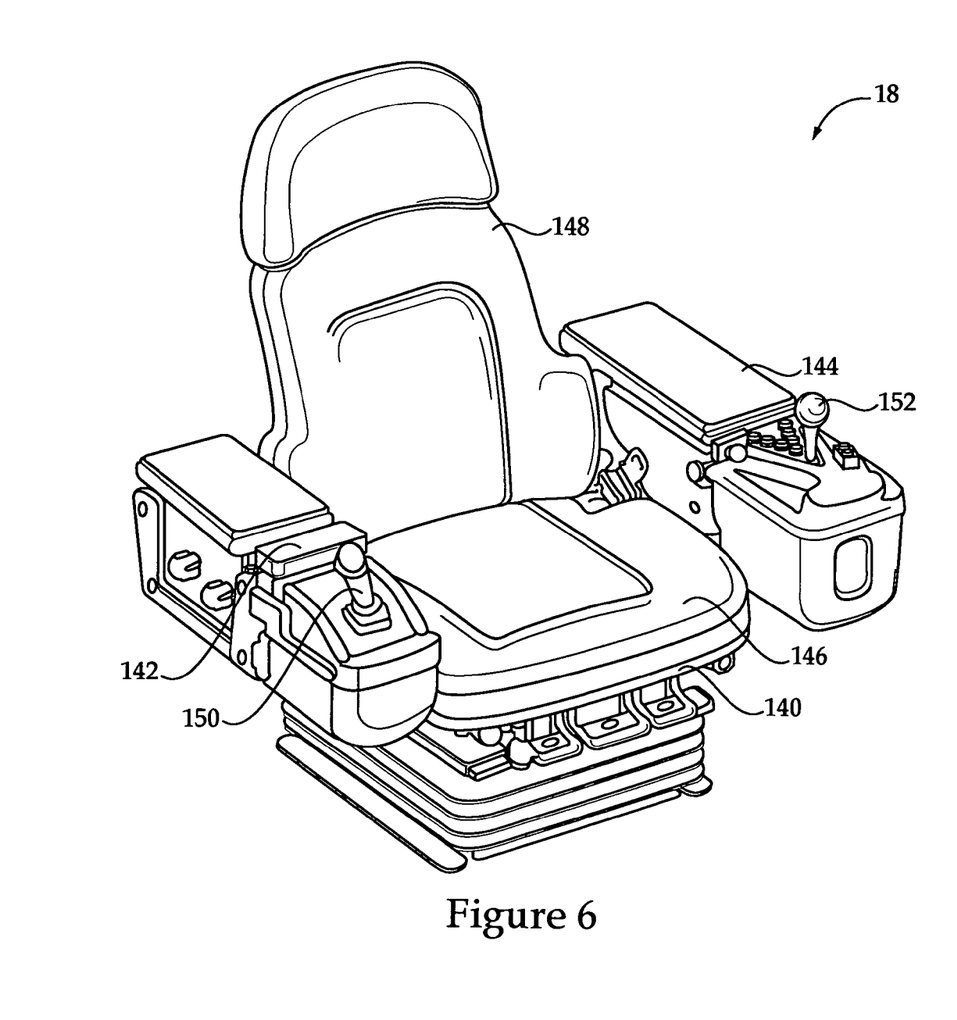
FIG. 6 is a perspective view of a seat assembly of the machine of FIG. 1.

According to an alternative embodiment, the mechanical strut 32 may be used in the seat assembly 18 of machine 10. The seat assembly 18 is shown in FIG. 6 and includes a frame 140 to which a first armrest 142, a second armrest 144, a seat 146, and a back 148 are attached. The seat assembly 18 may also include one or more machine operation controllers, such as controllers 150 and 152, pivotably attached to the first armrest 142 and second armrest 144, respectively. Controllers 150 and 152 may be used to control various operations of the machine 10. For example, controller 150 may be used to control movement of the implement 20 of the machine 10.

Figure 7:
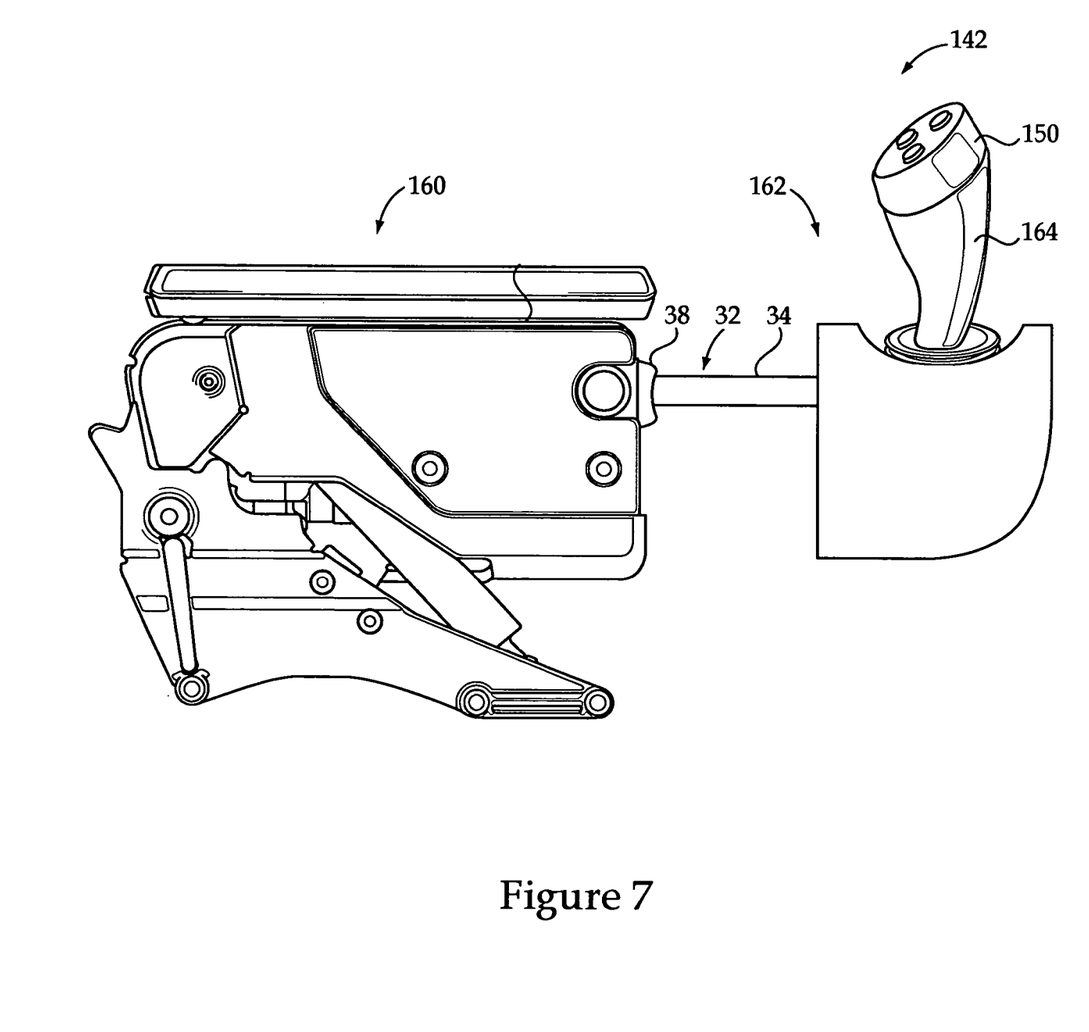
FIG. 7 is a side diagrammatic view of an armrest of the seat assembly of FIG. 6.

Turning now to FIG. 7, the first armrest 142 is shown in greater detail. The armrest 142 may include a first portion 160 and a second portion 162. The second portion 162 may include controller 150. Mechanical strut 32, as described above, may be positioned within the armrest 142, as shown, to move the second portion 162 of the armrest 142 along a horizontal axis. Specifically, the outer tube 36 of the mechanical strut 32, at the first attachment end 42, may be attached to the first portion 160 of the armrest 142. The inner tube 34 of the mechanical strut 32, at the second attachment end 52, may be attached to the second portion 162 of the armrest 142. A length adjustment device 164, which may include the controller 150, may actuate the trigger 62 of the mechanical strut 32 to move the friction lock mechanism 70 to a released configuration, as described above. For example, movement of the controller 150 about a horizontal axis may release the friction lock mechanism 70 and allow movement of the second portion 162 of the armrest 142 through a continuous range of armrest lengths.

According to a further example, it may be desirable to provide an additional telescoping member within the armrest 142 that runs parallel to the mechanical strut 32. An additional telescoping member may include only an inner and outer tube, such as inner and outer tubes 34 and 36, and may be free of a locking mechanism, such as the friction lock mechanism 70 of mechanical strut 32. The additional telescoping member may provide additional support for the first and second portions 160 and 162 of the armrest 142. It should be appreciated that various devices may be used in conjunction with the mechanical strut 32.

INDUSTRIAL APPLICABILITY

Adjustment devices are used in a number of applications, including various applications within an operator control station 12 of a machine 10. Specifically, adjustment devices may be used for adjusting steering column assemblies, seat assemblies, operation controllers, and various other devices to allow for different operator preferences. According to some applications, adjustment devices allow positioning of a component to one of a finite number of adjustment positions. Although these devices may be effective, they offer only a limited range of motion of the device.

Gas struts may provide for the desired range of positions in various applications; however, because a gas strut requires seals, it is susceptible to leaks during operation. Such leaks, if not addressed, may lead to ultimate failure of the strut. Utilizing the mechanical strut 32 of the present disclosure for adjustment of a steering column assembly 16, a seat assembly 18, or other adjustable component provides a continuous range of potential positions available to the operator, without the known problems associated with gas struts. In addition, for adjustable components, such as, for example, a steering column assembly, currently utilizing a gas strut, the mechanical strut 32, free of pressurized gas, may replace the gas strut as a retrofit requiring minimal changes. It should, therefore, be appreciated that the mechanical strut 32 of the present disclosure finds potential application anywhere a gas strut is currently being used.

The mechanical strut 32, as shown in FIG. 3, includes an inner tube 34 and an outer tube 36. The outer tube 36 is configured to telescopically receive the inner tube 34 and provide a continuous range of lengths between a fully expanded length and a fully retracted length of the mechanical strut 32. A trigger 62 is provided for releasing a friction lock mechanism 70 of the mechanical strut 32. The friction lock mechanism 70 includes a first locking member 72 and a second locking member 74. The first locking member 72 may be fixedly attached to a distal end 76 of the inner tube 34 and may include a structure having a least one finger, such as, for example, fingers 78 and 80, for receiving the second locking member 74. Biased engagement of the first and second locking members 72 and 74 forces at least one of the fingers 78 and 80 of the first locking member 72 into frictional engagement with an inner surface 82 of the outer tube 36, thereby preventing telescopic movement of the mechanical strut 32.

The trigger 62 may be actuated for moving the second locking member 74 out of engagement with the first locking member 72, and moving the friction lock mechanism 70 into a released configuration. Specifically, the threaded member 112 is movable along a linear axis within the inner tube 34 in response to movement of the trigger 62. A second end 116 of the threaded member 112, having threads 118 on the exterior thereof, is configured to engage a spiral patterned protrusion 120 extending from an internal surface 122 of a first end 124 of an elongate sleeve 126 provided within the inner tube 34.

When the threaded member 112 is moved in a linear direction, threads 118 of the threaded member 112 engage the spiral patterned protrusion 120 of the sleeve 126 and cause the sleeve 126 to move in a rotational direction. A second end 130 of the sleeve 126 includes a hexagonal shaped bore 132 therethrough for receiving a rod 134. The rod 134 includes a hexagonal shaped first end 136 extending through the bore 132 and a second end 138 fixedly attached to the second locking member 74, such as by a threaded engagement. Rotational movement of the sleeve 126, therefore, causes rotational movement of the rod 134.

The key 110 is positioned within at least a portion of each of the first locking member 72 and the second locking member 74 for preventing one of the first locking member 72 and the second locking member 74 from rotating relative to the other. The key 110 prevents the rotational movement of the rod 116 from rotating the second locking member 74 and, indirectly, the first locking member 72, and causes the second locking member 74 to move in a linear direction and out of engagement with the first locking member 72.

This ultimately moves the second locking member 74 out of engagement with the first locking member 72 and allows the mechanical strut 32 to be continuously adjusted between a fully extended length and a fully retracted length. By translating the linear motion caused by the trigger 62 to rotational motion and the rotational motion back to linear motion, it should be appreciated that greater precision may be achieved. Force applied to the trigger 62 may be controlled through the translation, and the second locking member 74 may be moved out of engagement with the first locking member 72 only the amount necessary to move the first locking member 72 out of frictional engagement with the inner surface 82 of the outer tube 36. It should also be appreciated that the threaded member 112 will be moved a first distance and the second locking member 74 will be moved a second distance that is less than the first distance.

Spring 139 may be provided within inner tube 34 or sleeve 126 for biasing the threaded member 112 and, indirectly, the trigger 62 toward the second attachment end 52. When biased in such a manner, the trigger 62 remains in a non-actuated position. Alternatively, springs 100 and 102 may be provided to bias the first and second locking members 72 and 74 into engagement. By biasing the first and second locking members 72 and 74 into engagement, the rod 134, threaded member 112, and sleeve 126 are moved toward attachment end 52, thereby returning the trigger 62 to a non-actuated position.

According to a first example, shown in FIG. 2, the trigger 62 may be actuated to release the friction lock mechanism 70 of the mechanical strut 32, as described above. When the friction lock mechanism 70 is released, the steering wheel 26, at base 24, and/or the steering column 22 may be tilted about a horizontal axis. When the base 24 is tilted upward, it should be appreciated that the inner tube 34 may telescope within the outer tube 36 to shorten the length of the mechanical strut 32. FIG. 8 shows the mechanical strut 32 at a fully retracted, or shortened, length. Alternatively, when the base 24 is tilted downward, it should be appreciated that the inner tube 34 may be telescoped out of the outer tube 36 to provide a greater length of the mechanical strut 32. A fully expanded length of the mechanical strut 32 is illustrated in FIG. 9. When the operator has selected a desired tilt position, the trigger 62, or additional tilt adjustment mechanism 104 connected to the trigger 62, may be released to frictionally engage the friction lock mechanism 70 and prevent further telescopic movement of the mechanical strut 32. Specifically, the biased engagement of the first and second locking members 72 and 74 is allowed, and the first locking member 72 frictionally engages the inner surface 82 of the outer tube 36 to lock the steering wheel base 24 at the selected position.

According to a second example, shown in FIG. 7, the controller 150, attached directly or indirectly to the trigger 62, may be actuated to release the friction lock mechanism 70 of the mechanical strut 32. When the friction lock mechanism 70 is released, such as by tilting the controller 150, the second portion 162 of the armrest 142 is adjustable through a continuous range of armrest lengths, i.e., the second portion 162 is movable along a horizontal axis. When the second portion 162 is moved toward the first portion 160, it should be appreciated that the inner tube 34 may telescope within the outer tube 36 to shorten the length of the mechanical strut 32. FIG. 8 shows the mechanical strut 32 at a fully retracted, or shortened, length. Alternatively, when the second portion 162 is moved away from the first portion 160, it should be appreciated that the inner tube 34 may be telescoped out of the outer tube 36 to provide a greater length of the mechanical strut 32. A fully expanded length of the mechanical strut 32 is illustrated in FIG. 9. When the operator has selected a desired armrest length, the controller 150, connected to the trigger 62, may be released to frictionally engage the friction lock mechanism 70 and prevent further telescopic movement of the mechanical strut 32.

Although specific examples have been given, it should be appreciated that the mechanical strut 32 of the present disclosure will find use in numerous applications, including, but not limited to, applications in which continuous adjustment of a component is desired. Specifically, the mechanical strut 32, including the friction lock mechanism 70, is adjustable through a continuous range of lengths between a fully expanded length, as shown in FIG. 9, and a fully retracted length, as shown in FIG. 8.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine, comprising:
a steering column assembly;
a mechanical strut pivotably attached to the steering column assembly and positioned to tilt at least a portion of the steering column assembly about an axis, wherein the mechanical strut is free of pressurized gas;
a trigger movable to release a friction lock mechanism, which includes a frustoconical shape, within the mechanical strut; and
wherein the mechanical strut is telescopically movable through a continuous range of positions when the friction lock mechanism is released.

2. The machine of claim 1, wherein the mechanical strut includes a first attachment end pivotably attached to a steering wheel base of the steering column assembly and a second attachment end pivotably attached to a steering column of the steering column assembly.

3. A machine, comprising:
a steering column assembly;
a mechanical strut pivotably attached to the steering column assembly and positioned to tilt at least a portion of the steering column assembly about an axis, wherein the mechanical strut is free of pressurized gas;
a trigger movable to release a friction lock mechanism within the mechanical strut;
wherein the mechanical strut is telescopically movable through a continuous range of positions when the friction lock mechanism is released; and
a guard member extending over an end of an outer tube of the mechanical strut and including an opening therethrough for receiving an inner tube of the mechanical strut.

4. The machine of claim 3, further including a first locking member of the friction lock mechanism attached to an end of the inner tube and configured to receive a second locking member.

5. The machine of claim 4, wherein the first locking member includes at least one movable finger for receiving a substantially frustoconical shape of the second locking member.

6. The machine of claim 5, further including a spring for biasing the first and second locking members into engagement, wherein the second locking member is configured to move at least a portion of the first locking member into frictional engagement with an inner surface of the outer tube during engagement.

7. The machine of claim 6, wherein the trigger is pivotably attached to an attachment end of the inner tube for moving the second locking member out of engagement with the first locking member.

8. The machine of claim 7, further including a threaded member having a first end positioned within the trigger and a second end having external threads on a portion thereof, wherein the threaded member is movable within the inner tube along a linear axis in response to movement of the trigger.

9. The machine of claim 8, further including an elongate sleeve having a first end including a spiral patterned protrusion on an internal surface thereof and a second end having a hexagonal shaped bore therethrough, wherein linear movement of the threaded member causes the external threads of the threaded member to engage the spiral patterned protrusion of the elongate sleeve and cause rotational movement thereof 10. The machine of claim 9, further including a rod having a hexagonal shaped first end extending through the hexagonal shaped bore of the elongate sleeve and a second end threadably attached to the second locking member, wherein rotational movement of the elongate sleeve causes rotational movement of the rod.

11. The machine of claim 10, further including a key positioned within at least a portion of each of the first locking member and the second locking member for preventing one of the first locking member and the second locking member from rotating relative to the other, wherein rotational movement of the rod causes linear movement of the second locking member.

12. A method of tilting at least a portion of a steering column assembly about an axis, comprising:
actuating a trigger of the steering column assembly to release a friction lock mechanism of a mechanical strut;
tilting the portion of the steering column assembly through a continuous range of positions; and
releasing the trigger to engage the friction lock mechanism of the mechanical strut;

wherein movement of the friction lock mechanism includes translating rotational movement into linear movement.

13. A method of tilting at least a portion of a steering column assembly about an axis, comprising:
    actuating a trigger of the steering column assembly to release a friction lock mechanism of a mechanical strut;
    tilting the portion of the steering column assembly through a continuous range of position;
    releasing the trigger to engage the friction lock mechanism of the mechanical strut;
    biasing at least one of a first locking member of the friction lock mechanism and a second locking member of the friction lock mechanism into engagement with the other; and
    moving the first locking member into frictional engagement with an inner surface of the mechanical strut.

14. The method of claim 13, wherein the actuating step includes moving the second locking member out of biased engagement with the first locking member.

15. The method of claim 14, wherein the actuating step includes:
    moving a threaded member along a linear axis; and
    causing external threads of the threaded member to engage a spiral patterned protrusion of an elongate sleeve and cause rotational movement thereof.

16. The method of claim 15, wherein the actuating step further includes causing a hexagonal shaped bore of the elongate sleeve to engage a hexagonal shaped portion of a rod and cause rotational movement thereof.

17. The method of claim 16, wherein the actuating step further includes preventing one of the first and second locking members from rotating relative to the other in response to rotational movement of the rod, thereby causing linear movement of the second locking member.

18. The method of claim 12, wherein the tilting step includes tilting a steering wheel of the steering column assembly about a horizontal axis.

19. The method of claim 12, wherein the tilting step includes tilting a steering column of the steering column assembly about a horizontal axis.

20. The method of claim 12, wherein the tilting step includes adjusting a length of the mechanical strut to one of a continuous range of lengths between a fully extended length and a fully retracted length.

* * * * *